Nov. 18, 1924.

L. BREGUET 1,516,371

PROCESS OF MANUFACTURE OF A LIGHT AND RESISTING WARPABLE METALLIC SURFACE

Filed Nov. 7, 1921

Inventor
Louis Breguet
By Maury, Cameron, Lewis & Kerkam
Attorneys

Patented Nov. 18, 1924.

1,516,371

UNITED STATES PATENT OFFICE.

LOUIS BREGUET, OF PARIS, FRANCE, ASSIGNOR TO SOCIÉTÉ ANONYME DES ATELIERS D'AVIATION LOUIS BRÉQUET, OF PARIS, FRANCE.

PROCESS OF MANUFACTURE OF A LIGHT AND RESISTING WARPABLE METALLIC SURFACE.

Application filed November 7, 1921. Serial No. 513,550.

*To all whom it may concern:*

Be it known that I, LOUIS BREGUET, residing at Paris, France, a citizen of the Republic of France, have invented certain new and useful Improvements in Processes of Manufacture of a Light and Resisting Warpable Metallic Surface, of which the following is a specification.

The present invention relates to the manufacture of a warpable metallic surface having a great rigidity owing to its high moment of inertia while being very light and of very simple construction, advantages which it is impossible to obtain by the use of sheet iron which this surface is adapted to replace in all its applications.

The surface which is the object of this invention is constituted by a series of strips or elements of extremely thin sheet iron (for instance, 10 to 15 hundredths of a millimetre) placed side by side and fastened together along their whole length by means of suitable clamps or fasteners giving them the required rigidity.

It will be understood that this surface may be warped and altered in shape so as to adapt itself to any outline, of small curvature, of the bodies or frame on which it is to be mounted, the said surface constituting after its fixation a non-deformable whole adapted to resist pressure.

The following description together with the appended drawings, given as an example only, will help to clearly disclose the manner in which the invention is carried out.

In order to construct the warpable surface which is the object of the invention, one can use strips or elements of thin sheet iron *a* of channel shape connected together by small clamps *b* secured by tubular rivets *c* or simply fastened together. These strips are of small width, for instance 40 millimetres.

It will be understood that this surface may be very easily altered in shape by torsion and that, despite its extreme lightness, the clamps, acting like ribs, give it a high moment of inertia which enables it to resist very large pressures such as the air pressure in the case of a cowl of an aeroplane, and therefore to fulfill the function of thick sheet iron.

This surface can be altered in shape according to requirements and is fixed by any suitable means on the chassis or body of the aeroplane, vehicle, etc., for instance by means of a suitable frame adapted to fit the said chassis, or assembled thereupon.

It will be seen that in cases where the surface is intended to have a small curvature, it will be possible to twist or curve the said surface by means of clamps placed on the sheet iron strips but not riveted or fixed to the said strips and to perform the riveting or fixing only when the said surface has been brought to the degree of warp required in order to enable it to be put in position on the chassis or body of the aeroplane, motor car, etc.

In the case of pronounced curvature it is evident that use must be made of clamps which have been previously curved according to the different radii of curvature which the surface is required to have when in position.

Figure 1:
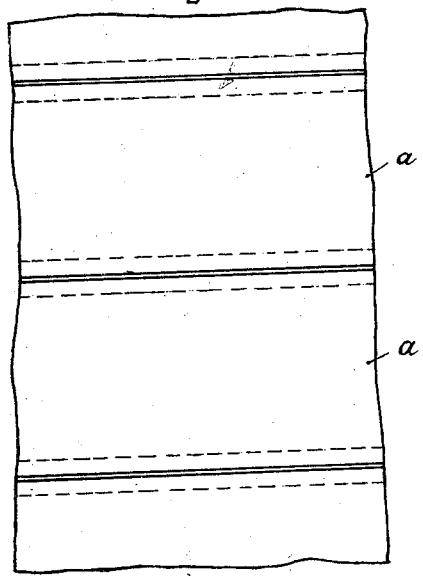
Figs. 1 and 2 show a front and side view of an element of the warpable surface constructed in accordance with this invention.
Figure 2:
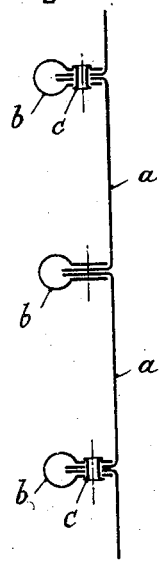
Figure 3:
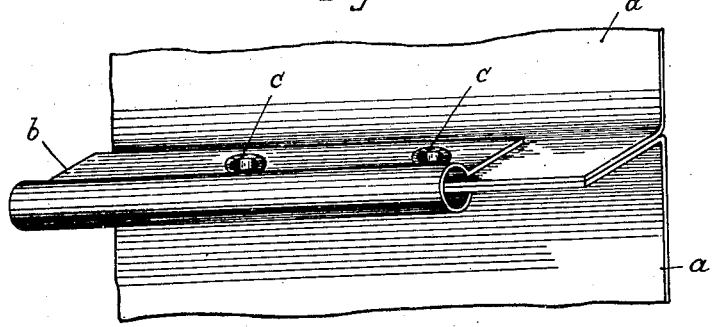
Fig. 3 is a perspective view showing the elements or strips of sheet iron when assembled together.
Figure 4:
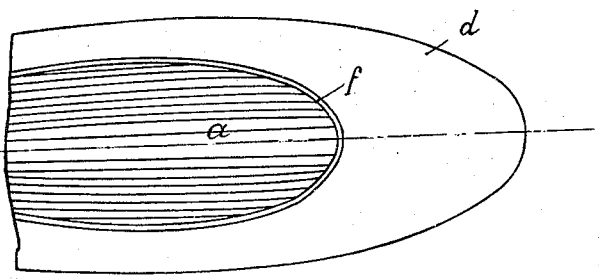
Fig. 4 is a diagrammatic view in plan showing the application of the warpable surface to the fabrication of a cowl for aeroplanes.

In Fig. 4 the fuselage *d* of an aeroplane is represented, the upper part of which is constituted by the warpable surface *a* which is the object of the invention. On the body of the fuselage is fixed a frame *f* on which the surface *a* is assembled after having been previously cut out so as to adopt the curvature of the frame *f*.

This warpable surface eliminates the use of templates and the preliminary working and shaping of the sheet iron. Besides this, in the case in which this warpable surface is used for the construction of aeroplanes cowls, said surface has the advantage of constituting a cowl having a minimum surface in contact with the air and a very small resistance to forward motion, for the said surface is very smooth and moreover its joints are placed in the direction of the wind which is not the case for corrugated iron sheet, for instance, which has a large frictional surface and is very stiff and difficult to mount.

Besides its application to the covering of a fuselage the system can evidently replace advantageously the canvas for the wings.

Modifications in the above described process may, of course, be employed in the construction of this surface; particularly the profile instead of being in the shape of a U can affect any suitable shape. Similarly the fastening of the strips or elements of sheet iron may be performed in any suitable manner.

What I claim and desire to secure by Letters Patent is:

1. A process for the fabrication of a light and resisting warpable metallic surface, which consists in arranging a plurality of thin, pliable metallic strips or elements in side by side relation and securing said strips or elements together by rib-forming clamping plates.

2. A process for the fabrication of a light and resisting warpable metallic surface, which consists in arranging a plurality of thin, pliable metallic strips or elements in side by side relation, assembling said strips or elements together by rib-forming fastening means, placing the assembly of strips and fastening means on an object to be covered, and securing said strips and rib-forming fastening means together after the assembly is positioned on said object.

3. A process for the fabrication of a light and resisting warpable metallic surface, which consists in arranging a plurality of thin, pliable channel-shaped strips or elements in side by side relation, assembling said channel-shaped strips or elements together by rib-forming fastening devices, and securing said rib-forming fastening devices to the channel-shaped strips or elements.

In testimony whereof I have signed this specification.

LOUIS BREGUET.